(12) United States Patent
Russo

(10) Patent No.: US 8,403,191 B2
(45) Date of Patent: Mar. 26, 2013

(54) PICKUP LADDER RACK

(76) Inventor: James C. Russo, Portsmouth, NH (US)

( * ) Notice: Subject to any disclaimer, the term of this patent is extended or adjusted under 35 U.S.C. 154(b) by 136 days.

(21) Appl. No.: 12/859,050

(22) Filed: Aug. 18, 2010

(65) Prior Publication Data

US 2011/0186610 A1 Aug. 4, 2011

Related U.S. Application Data

(60) Provisional application No. 61/234,696, filed on Aug. 18, 2009, provisional application No. 61/292,993, filed on Jan. 7, 2010.

(51) Int. Cl.
B60R 9/00 (2006.01)
B60R 3/00 (2006.01)
B60R 7/00 (2006.01)

(52) U.S. Cl. ............. 224/405; 224/546; 224/548; 296/3

(58) Field of Classification Search .................. 224/405, 224/402, 403, 546–549, 557, 432, 444, 497; 296/3, 98, 100.12, 100.15; 410/89, 143, 410/144
See application file for complete search history.

(56) References Cited

U.S. PATENT DOCUMENTS

| | | | | |
|---|---|---|---|---|
| 4,405,170 A * | 9/1983 | Raya | ................................ | 296/10 |
| 4,659,131 A | 4/1987 | Flourny et al. | | |
| 4,751,981 A | 6/1988 | Mitchell et al. | | |
| 4,770,458 A * | 9/1988 | Burke et al. | ........................ | 296/3 |
| 4,909,352 A | 3/1990 | McComb | | |
| 5,002,324 A * | 3/1991 | Griffin | ............................... | 296/3 |
| 5,242,094 A | 9/1993 | Finley | | |
| 5,513,890 A | 5/1996 | Christensen | | |
| 5,651,484 A | 7/1997 | Fugman | | |
| 5,725,137 A * | 3/1998 | Macdonald | .................... | 224/405 |
| D394,639 S * | 5/1998 | Carter | ........................... | D12/406 |
| D398,284 S * | 9/1998 | Carter et al. | .................. | D12/406 |
| 5,806,905 A | 9/1998 | Moore | | |
| 5,836,635 A * | 11/1998 | Dorman | ............................. | 296/3 |
| 5,951,092 A * | 9/1999 | Cissell | ...................... | 296/100.12 |
| 5,996,736 A | 12/1999 | Stankiewicz | | |
| 6,092,972 A | 7/2000 | Levi | | |
| 6,186,571 B1 * | 2/2001 | Burke | ............................... | 296/3 |
| 6,511,117 B1 * | 1/2003 | Henning | .................. | 296/100.15 |
| 6,655,722 B2 * | 12/2003 | Bareket | ............................. | 296/3 |
| D494,921 S * | 8/2004 | Taylor | ........................... | D12/414 |
| 6,971,563 B2 | 12/2005 | Levi | | |
| 6,973,996 B2 | 12/2005 | Huff | | |
| 7,210,559 B2 | 5/2007 | Hickey | | |
| 7,210,721 B1 | 5/2007 | Bell | | |
| D553,553 S * | 10/2007 | Taylor | ........................... | D12/414 |
| 7,296,836 B1 * | 11/2007 | Sabo | ................................. | 296/3 |
| 7,740,430 B2 * | 6/2010 | Mchugh et al. | .................. | 410/89 |
| 2003/0201656 A1 | 10/2003 | Ferguson et al. | | |
| 2008/0079277 A1 | 4/2008 | Wethington | | |
| 2008/0116008 A1 | 5/2008 | Wass et al. | | |
| 2009/0096236 A1 | 4/2009 | Hawley | | |

* cited by examiner

Primary Examiner — Nathan J Newhouse
Assistant Examiner — Todd Anderson
(74) Attorney, Agent, or Firm — Mesmer & Deleault, PLLC

(57) ABSTRACT

A mounting rack for mounting a ladder to a pickup truck. The pickup truck has a pickup truck bed defining a passenger side wall, a driver side wall, a front end side, and a tailgate side. The mounting rack includes a first mounting structure configured to support a first end of the ladder and a second mounting structure moveable between a storage position and an operating position. The second mounting structure is configured to support a second end of the ladder when in the operating position and abut the first mounting structure when in the storage position. The mounting rack also includes a first docking assembly configured to affix the second mounting structure to the passenger side wall and the driver side wall on the tailgate side of the pick-up truck bed when the second mounting structure is in the operating position, and a second docking assembly.

12 Claims, 7 Drawing Sheets

1

PICKUP LADDER RACK

CROSS REFERENCE TO RELATED APPLICATIONS

This Patent Application claims the benefit of U.S. Provisional Patent Application No. 61/234,696 filed on Aug. 18, 2009, entitled, "PICKUP LADDER RACK", the contents and teachings of which are hereby incorporated by reference in their entirety.

This Patent Application claims the benefit of U.S. Provisional Patent Application No. 61/292,993 filed on Jan. 7, 2010, entitled, "PICKUP LADDER RACK", the contents and teachings of which are hereby incorporated by reference in their entirety.

BACKGROUND

Pickup trucks are often used as a utility vehicle for moving tools that a contractor might use. Contractors often need to move ladders to a worksite. However, pickup truck beds are typically too short to carry a ladder in the bed without one end sticking out the back. It would be beneficial to provide a rack that secures a ladder horizontally over the cab and bed.

One type of pick-up truck rack is described in U.S. Pat. No. 5,513,890 to Christensen that issued on May 7, 1996 (hereinafter Christensen). Christensen describes a system that has horizon base rails on each bed wall, stanchion units, and support beams hanging from the stanchion units to enable it to pick up overhanging loads.

Another type of pick-up truck rack is described in U.S. Pat. No. 6,092,972 to Levi that issued on Jul. 25, 2000 (hereinafter Levi). Levi employs a four bar linkage to raise a ladder over the cab of a truck.

Yet another type of pick-up truck rack is described in U.S. Pat. App. Pub. No. 2009/0096236 A1 to Hawley that was published on Apr. 16, 2009 (hereinafter Hawley). Hawley discloses a vertical rack suitable for securing ladders and ramps.

SUMMARY

Unfortunately there are deficiencies to the above-described conventional pick-up ladder racks. For example, the Christensen rack is a rigid structure that extremely expensive to manufacture, since fabrication of its components are typically milled and extruding. This rigid structure cannot be collapsed to take up less space in the truck bed when not in use. Additionally, the rack Levi has a number of joints that are susceptible to rattling and wear over time. Also, the rack in Hawley cannot be stowed toward the front of the bed when not in use. The ladder, in Hawley, is supported by thin vertical supports that may have a tendency to rattle.

Therefore, what is needed is a ladder rack for securing a ladder horizontally over a pickup cab and bed that is strong, inexpensive to manufacture, does not rattle, and can be collapsed to reduce space when not in use.

In contrast to the above-identified conventional pick-up truck racks, an improved pick-up truck rack includes front and rear trapezoidal mounting structures made of square tubing that span the length of the truck bed while in use and collapses to the front of the truck when being stored. A tension clamp mechanism prevents rattling of the truck rack while in its storage position.

One embodiment is directed to a mounting rack for mounting a ladder to a pick-up truck. The pick-up truck has a pick-up truck bed defining a passenger side wall, a driver side wall, a front end side, and a tailgate side. The mounting rack includes a first mounting structure constructed and arranged to support a first end of the ladder and a second mounting structure moveable between a storage position and an operating position. The second mounting structure is constructed and arranged to support a second end of the ladder when in the operating position and abut the first mounting structure when in the storage position. The mounting rack also includes a first docking assembly constructed and arranged to affix the second mounting structure to the passenger side wall and the driver side wall on the tailgate side of the pick-up truck bed when the second mounting structure is in the operating position, and a second docking assembly. The second docking assembly is constructed and arranged to: (i) simultaneously affix both the first mounting structure and the second mounting structure to both the passenger side wall and the driver side wall on a front end side of the pick-up truck bed when the second mounting structure is in the storage position, (ii) affix the first mounting structure to the passenger side wall and the driver side wall on the front end side of the pick-up truck bed when the second mounting structure is in the operating position, and (iii) release the second mounting structure from the passenger side wall and the driver side wall on the front end side of the pick-up truck bed when the second mounting structure is in the operating position.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved pick-up truck rack includes front and rear trapezoidal mounting structures made of square tubing that span the length of the truck bed while in use and collapses to the front of the truck when being stored. A tension clamp mechanism prevents rattling of the truck rack while in its storage position.

Figure 1:
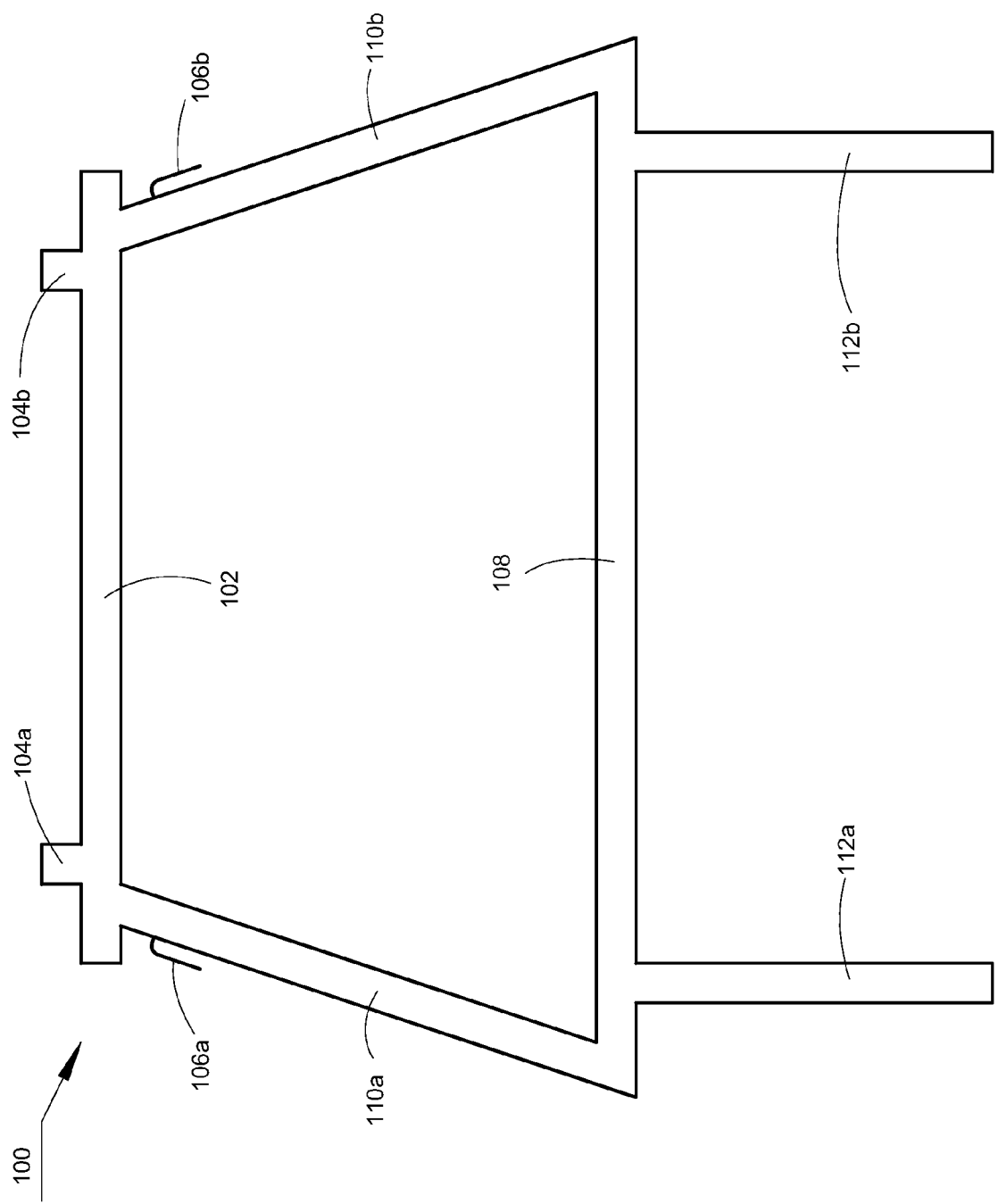
FIG. 1 is a front elevation of a front rack according to the present invention.

A first embodiment of the present invention is illustrated in FIGS. 1-6. Turning to FIG. 1, a first mounting structure 100 (i.e., front rack 100) is made primarily of square tubing, nominal 1 inch to 1.5 inch, welded or bolted together. It is preferably aluminum, but other materials could be used. The front rack 100 has an isosceles trapezoid having a bottom base 108 having a length substantially the same as the width of a pickup truck bed, two non-parallel sides 110a, 110b, and a top base 102. Optionally, a set of horns 104 (i.e., one or more horns; two horns 104a, 104b are shown by way of example only) can be provided at each end of the top base 102 that help secure a ladder onto the top base 102. Optionally, downward pointing hooks 106a, 106b can be provided secured to the non-parallel sides 110a, 110b respectively to assist using a rope or shock cord to secure a ladder to the top base 102.

Two supports 112a, 112b also made of square tubing are secured perpendicular to the trapezoid bottom base 108 in a spaced relationship to fit inside the bed of a pickup truck. The two supports 112a, 112b have a height that is substantially the same as the height of a pickup truck bed.

Figure 2:
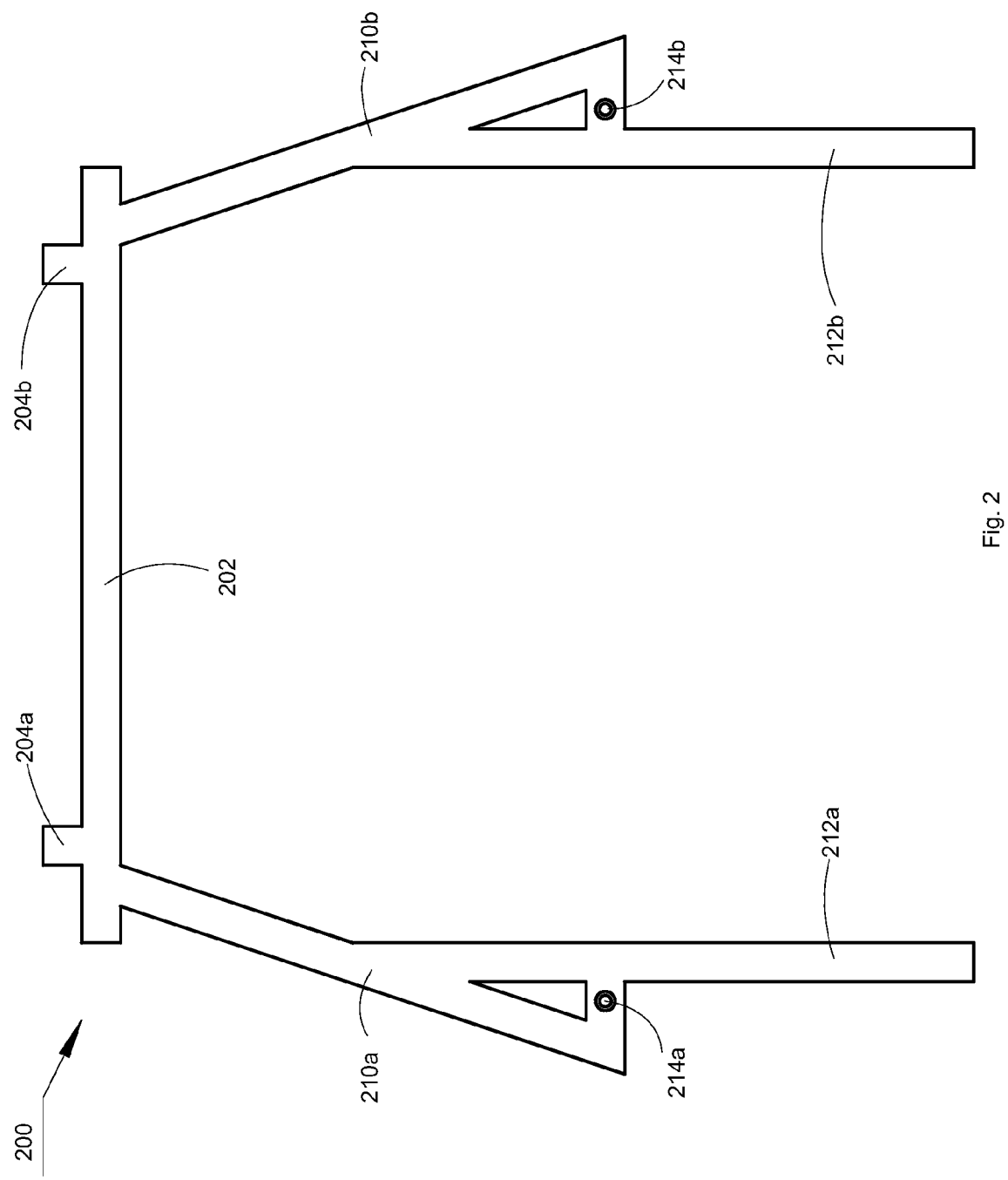
FIG. 2 is a front elevation of a rear rack according to the present invention.

A second mounting structure 200 (i.e., the rear rack 200) is shown in FIG. 2. The rear rack 200 also has an isosceles trapezoid having substantially the same dimensions as the front rack 100 except that the rear rack 200 does not have a full bottom base. The rear rack is made of square tubing, nominal 1 inch to 1.5 inch, welded or bolted together. The rear rack has two non-parallel sizes 210a, 210b, and a top base 202. Optionally, a set of horns 204 (i.e., one or more horns 204; two horns 204a, 204b are shown by way of example only) can be provided at each end of the top base 202 that help secure a ladder onto the top base 202.

The rear rack 200 also has two supports 212a, 212b secured perpendicular to the trapezoid non-parallel sizes in a spaced relationship to fit inside the bed of a pickup.

The rear rack 200 also has at least one threaded hole 214a, 214b that forms part of a tension clamp mechanism. The tension clamp mechanism separates the racks and prevents rattling between the front rack 100 and the rear rack 200 when stored together in a storage position, as shown more fully in FIG. 3.

Figure 3:
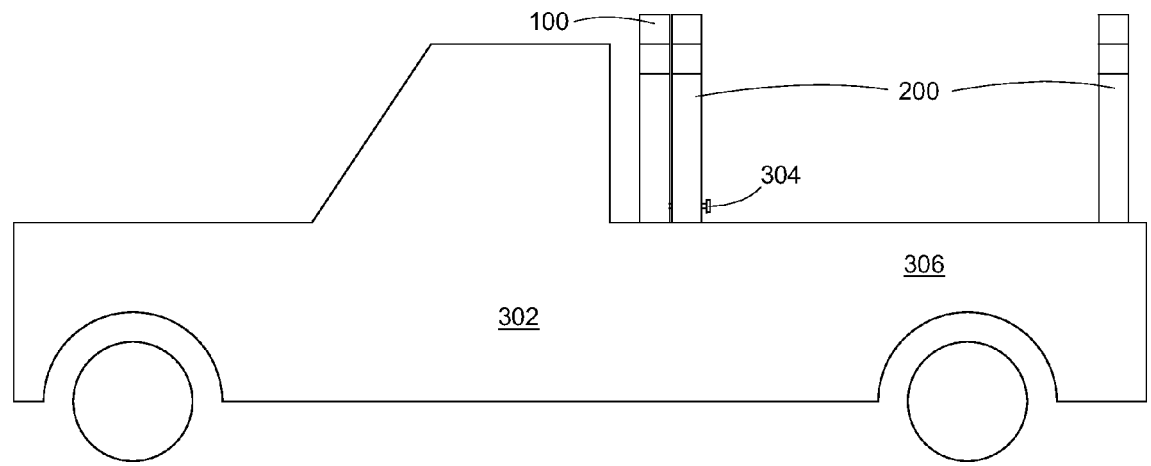
FIG. 3 is a side elevation of the racks on a pickup truck.

FIG. 3 is a side elevation of a pickup truck 302 having the front rack 100 and rear rack 200 shown in the stored and deployed positions within the pickup truck bed 306. A tension clamp mechanism 304 is shown. In one embodiment, the tension clamp mechanism 304 is a threaded bolt or screw that is threaded through the rear rack 200 and presses on the front rack 100, thereby separating them and preventing rattling.

Figure 4:
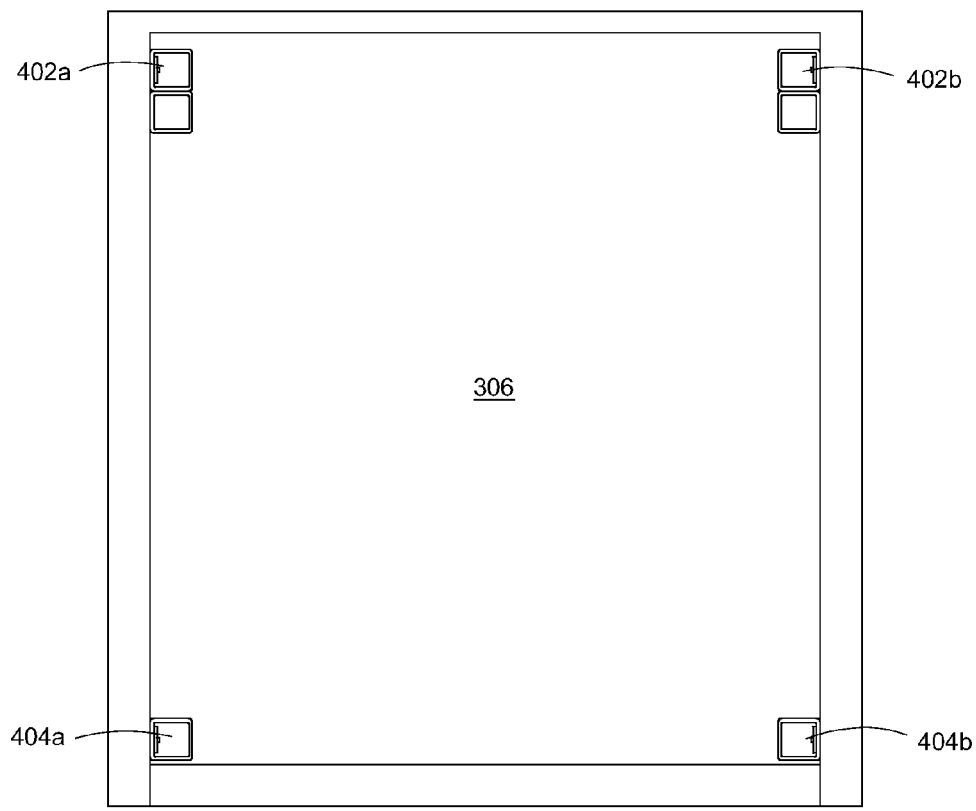
FIG. 4 is a plan view of a pickup truck bed showing the position of square channels used to support the front and rear racks.

FIG. 4 is a plan view of a pickup truck bed 306. A second docking assembly 402 (i.e., the pair of two square channels 402a, 402b) is provided towards the front of the bed 306 and sized to receive the front supports 112a, 112b and rear supports 212a, 212b, meaning the inside size of the square channels of 402a and 402b are larger than the outside size of the front supports 112a, 112b and rear supports 212a, 212b.

A first docking assembly 404 (i.e., the pair of single square channels 404a, 404b) is provided near the rear of the bed 306 and sized to receive the rear supports 212a, 212b. In this view one can see the structure attached to the channels for mounting these channels in factory-provided mounting holes in the bed 306. For example, bolting the channels to the factory provided holes could be plates secured to the channels having bolt holes and bolts.

Figure 5:
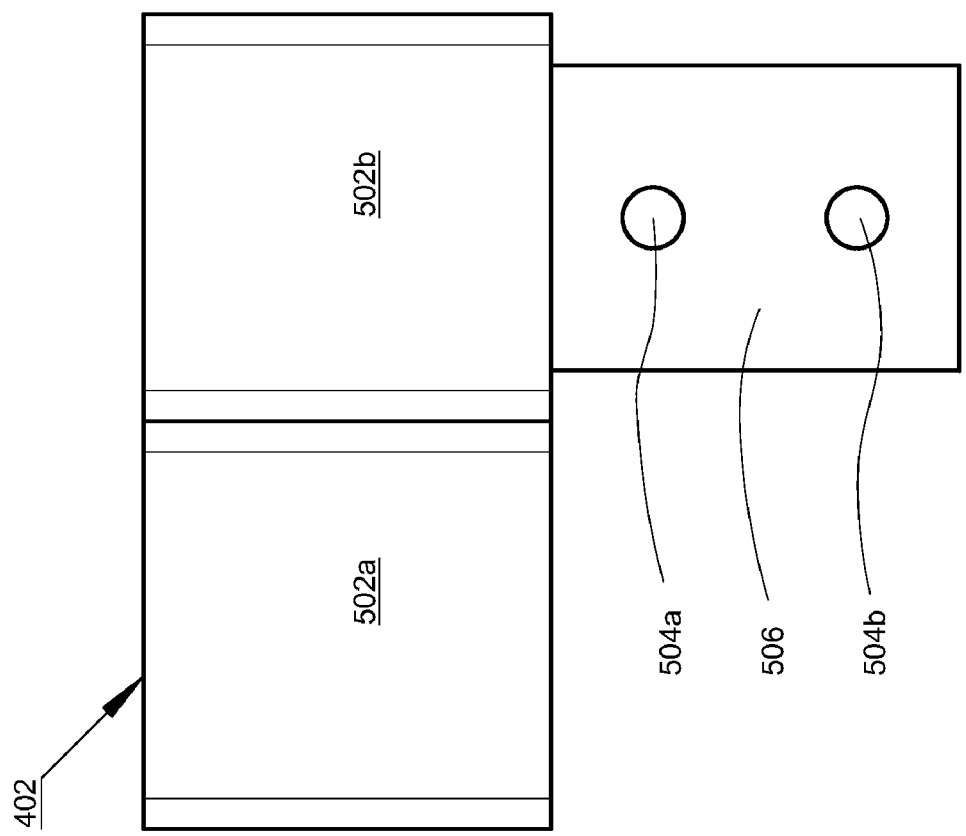
FIG. 5 is a side elevation of a square channel assembly sized to receive the front and rear racks.

FIG. 5 is a side elevation of a two square channel assembly 402. This assembly has a channel 502b for receiving a front rack support and another channel 502a for receiving a rear channel support when the rear channel support is in a collapsed position for storage. The channels are substantially the same size, parallel to each other, and may be secured to each other, for example, by welding or bolting. Bolting the channels to the factory provided holes in the front of the bed is shown as a plate 506 having two holes 504a, 504b corresponding to the holes in the front of the bed 306.

Figure 6:
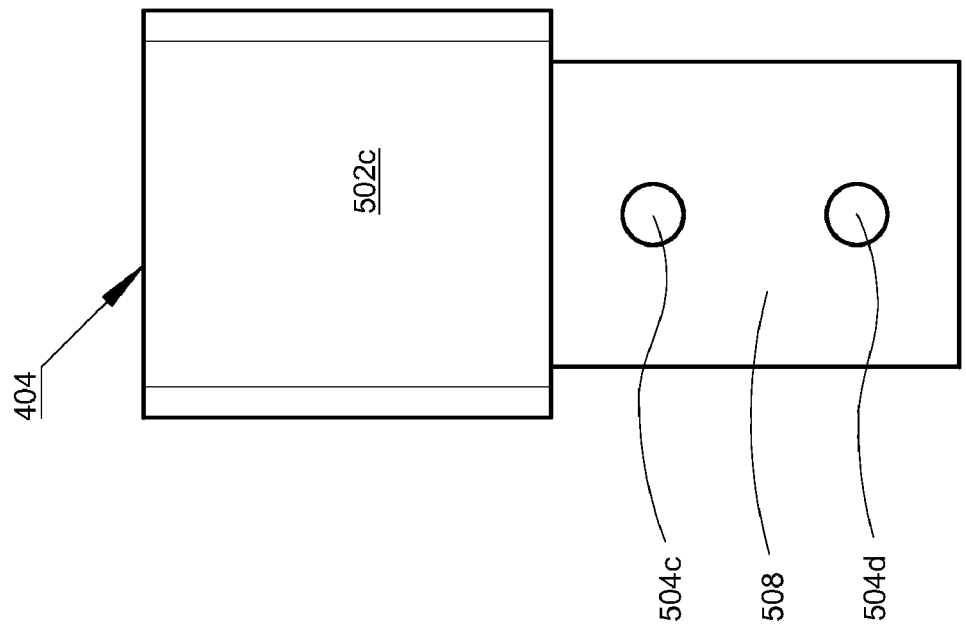
FIG. 6 is a side elevation of a square channel assembly sized to receive the rear rack.

FIG. 6 is similar to FIG. 5, except that a single channel 502c is provided. Bolting the channels to the factory provided holes in the rear of the bed is shown as a plate 508 having two holes 504c, 504d corresponding to the holes in the rear of the bed 306.

Figure 7:
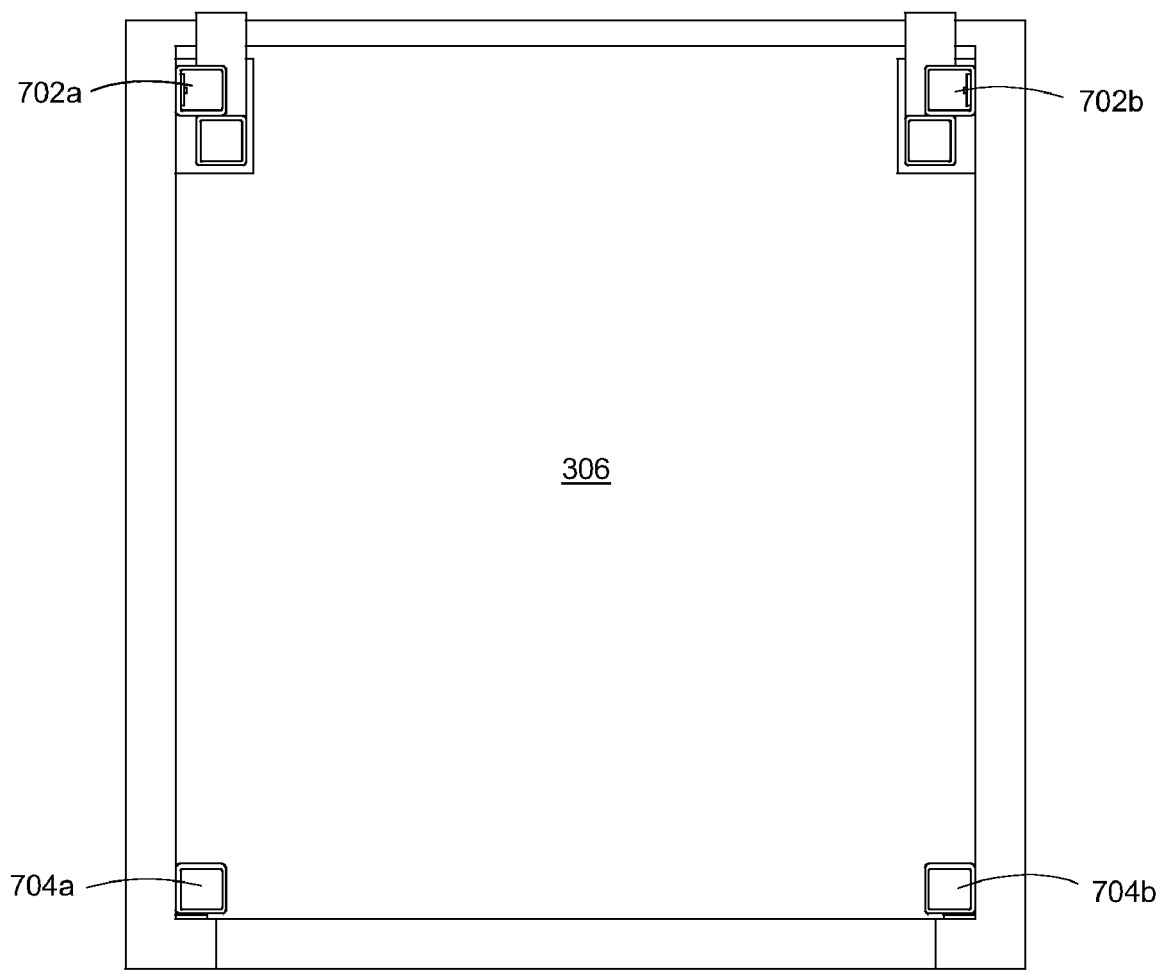
FIG. 7 is a plan view of a pickup truck bed showing the position of a second embodiment of square channels used to support the front and rear racks.
Figure 8:
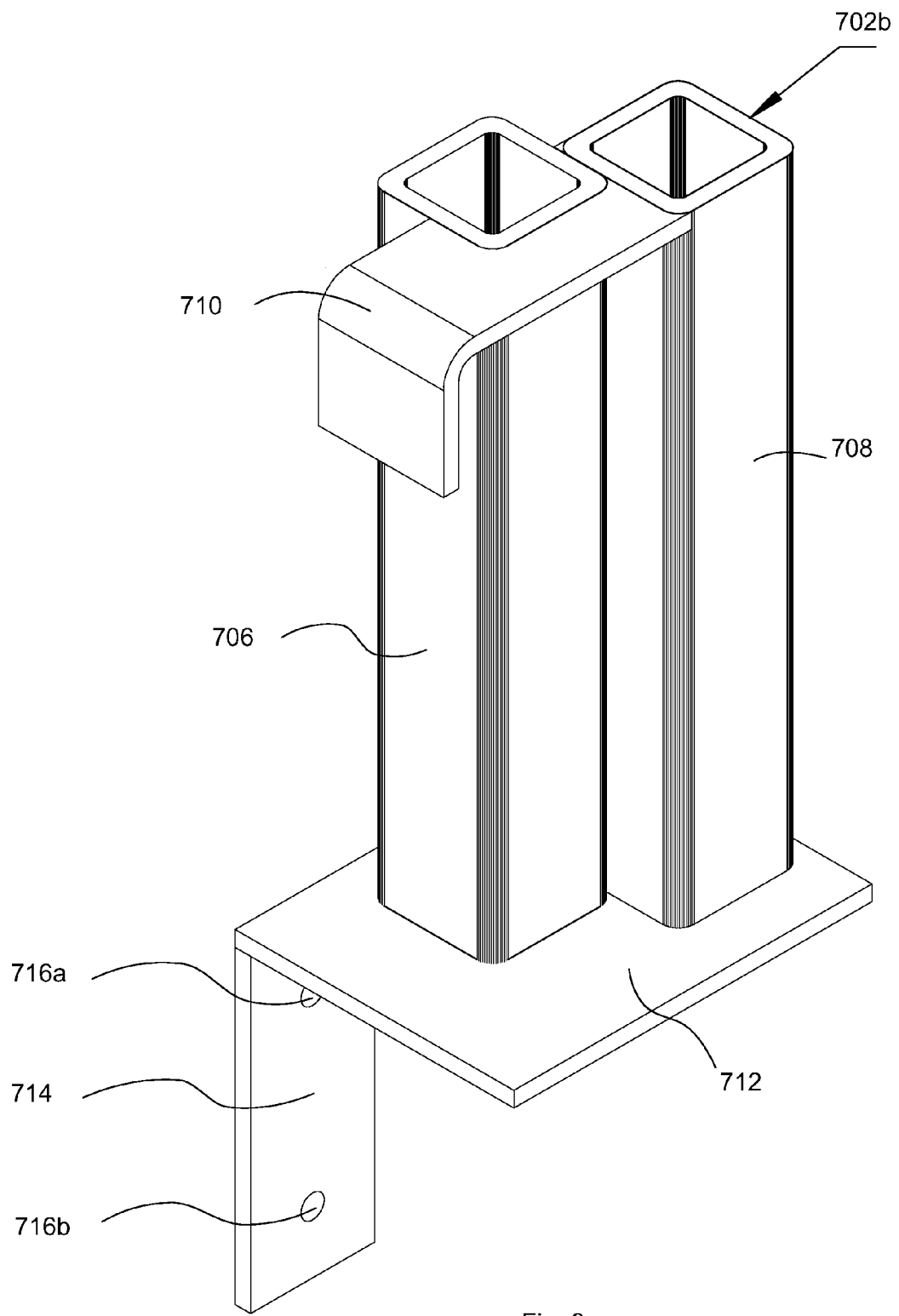
FIG. 8 is an orthogonal view showing details of second embodiment front channels.
Figure 9:
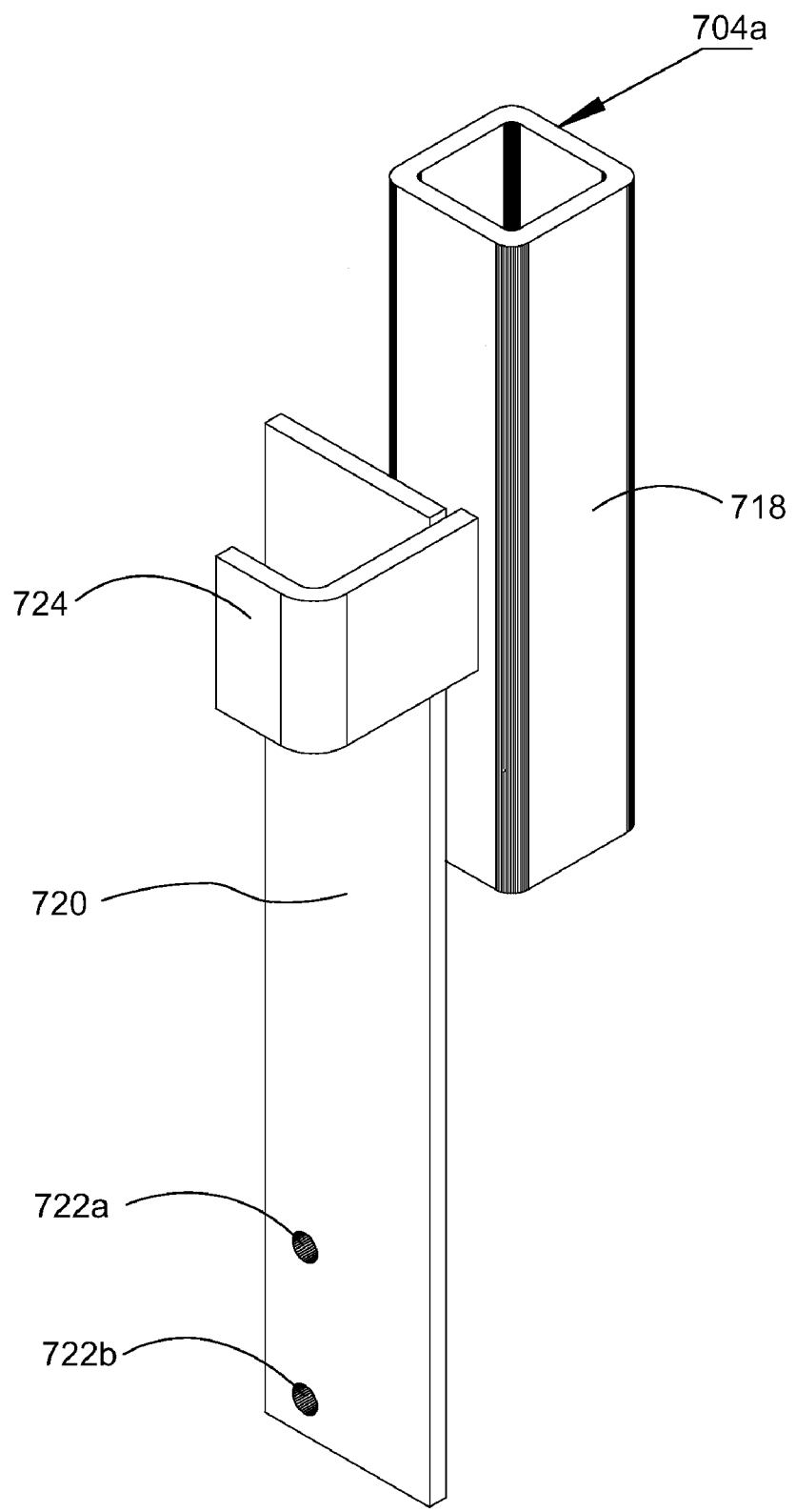
FIG. 9 is an orthogonal view showing details of second embodiment rear channels.

FIGS. 7, 8 and 9 show details of a second embodiment of front and rear channels. FIG. 7 is a plan view of the pickup truck bed 306. A second docking assembly 702 (i.e., the pair of two square channels 702a, 702b) is provided towards the front of the bed 306 and sized to receive the front supports 112a, 112b and rear supports 212a, 212b, meaning the inside size of the square channels of 402a and 402b are larger than the outside size of the front supports 112a, 112b and rear supports 212a, 212b.

A first docking assembly 704 (i.e., the pair of single square channels 704a, 704b) is provided near the rear of the bed 306 and sized to receive the rear supports 212a, 212b. In this view one can see the structure attached to the channels for mounting these channels in factory-provided mounting holes in the bed 306. For example, bolting the channels to the factory provided holes could be plates secured to the channels having bolt holes and bolts.

In FIG. 8, the right front set of channels 702b is shown, and the left front set 702a is a minor image. The right front set 702b comprises two channels 706, 708 secured parallel to each other, but offset as shown. The two channels are preferably about ten inches long.

A top latch or hook 710 is secured at the top of the channels and extending away and down for hooking the set 702b over the front lip of a pickup truck bed 306 over the bed rail under the rear window. An offset plate 712 is secured perpendicular to the bottom of the channels 706, 708. The offset plate 712 is sized to stand off the bottom of the channels from the walls of the bed 306 to orient the channels vertically when installed.

Bolting the channels 702 to the factory provided holes in the front of the bed is shown as a front plate 714 having two holes 716a, 716b corresponding to preexisting holes in the front of the bed 306. The front plate 716 is oriented on the side of the channels closes to the side of the bed 306. The front plate 716 is parallel with the channels and perpendicular to the offset plate 712, and is about five inches long. Therefore, the total height of the front channel assembly 702 is about 15 inches.

FIG. 9 is an orthogonal view of the left rear channel 704a of the second embodiment. The right rear channel 704b is a minor image. The left rear channel 704a comprises a channel 718, a rear plate 720, and a rear latch or hook 724. The rear channel 718 is preferably about 8.5 inches long. The rear channel 718 and rear plate 720 are secured parallel to each other but offset. The overall length of the rear channel assembly 704 is about 15.5 inches.

A rear hook 724 is secured to the rear channel 718 on the same surface as the rear plate 720. The rear hook 724 is position so that it hooks the rear of a pickup truck bed 306 for strength and to prevent rattling when installed. The rear plate has two holes 722a, 722b that correspond to the preexisting holes in the inside rear wall of the bed 306.

In each embodiment, the channels are preferably made of hollow structural square tubing having an inside height and width of at least about 1.5 inches.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims. For example, the front and rear docking assemblies could be switched if a user wished the rack to be stored towards the tailgate side of the cap instead of the front end side of the cab.

What is claimed is:

1. A mounting rack for mounting a ladder to a pick-up truck, the pick-up truck having a pick-up truck bed defining a passenger side wall, a driver side wall, a front truck bed wall, a front end side, and a tailgate side, the mounting rack comprising:
   a first mounting structure constructed and arranged to support a first end of the ladder;
   a second mounting structure moveable between a storage position and an operating position, the second mounting structure constructed and arranged to support a second end of the ladder when in the operating position and abut the first mounting structure when in the storage position;
   a first docking assembly having a first rear channel and a second rear channel, the first docking assembly constructed and arranged to affix the second mounting structure to the passenger side wall and the driver side wall on the tailgate side of the pick-up truck bed when the second mounting structure is in the operating position, each of the first rear channel and the second rear channel comprising:
      a rear plate extending vertically and having a plurality of holes therethrough;
      a rear channel tube fixedly attached to and parallel to the rear plate; and
      a rear hook fixedly attached to the rear channel tube and extending horizontally to hook around the tailgate side of the passenger side wall or the driver side wall;
   a second docking assembly having a first set of channels and a second set of channels constructed and arranged
      to simultaneously affix both the first mounting structure and the second mounting structure to both the passenger side wall and the driver side wall on a front end side of the pick-up truck bed when the second mounting structure is in the storage position,
      to affix the first mounting structure to the passenger side wall and the driver side wall on the front end side of the pick-up truck bed when the second mounting structure is in the operating position, and
      to release the second mounting structure from the passenger side wall and the driver side wall on the front end side of the pick-up truck bed when the second mounting structure is in the operating position,
   the first set of channels and the second set of channels each comprising:
      a front plate extending vertically and having a plurality of holes therethrough, an upper end and a lower end;
      an offset plate having a first lateral side, a second lateral side, and a top surface, the offset plate attached at the first side to the upper end of the front plate and extending substantially perpendicular to the front plate;
      a first channel tube extending along a first vertical axis and having a first channel tube top end, a first channel tube bottom end, a first channel tube front side, a first channel tube back side, a first channel tube first lateral side, and a first channel tube second lateral side, wherein the first channel tube bottom end is fixedly attached to the top surface of the offset plate;
      a second channel tube extending along a second vertical axis and having a second channel tube top end, a second channel tube bottom end, a second channel tube front side, a second channel tube back side, a second channel tube first lateral side, and a second channel tube second lateral side, wherein the second channel tube bottom end is fixedly attached to the top surface of the offset plate, and wherein the first channel tube is parallel to and offset from the second channel tube, wherein only a portion of the first channel tube back side abuts only a portion of the second channel tube front side; and
      a top latch connected to the first channel tube top end, the top latch extending away from and down from the first channel tube top end, the top latch adapted to be hooked over the front truck bed wall.

2. The mounting rack of claim 1, further comprising a tension clamp mechanism, the tension clamp mechanism comprising:
   a fastener extending through the second mounting structure and configured to engage the first mounting structure, the tension clamp mechanism constructed and arranged to (i) separate the first mounting structure from the second mounting structure when the second mounting structure is in the storage position and (ii) prevent rattling between the first mounting structure and the second mounting structure when the pick-up truck is in motion.

3. The mounting rack of claim 2:
   wherein the fastener is threaded and adjustable to prevent rattling between the first mounting structure and the second mounting structure by being constructed and arranged to be screwed to press against the first mounting structure and space the first mounting structure and the second mounting structure at a distance that reduces rattling.

4. The mounting rack of claim 1, wherein the first mounting structure is substantially trapezoidal and has:
   a top base constructed and arranged to hold the first end of the ladder;
   a bottom base substantially parallel to a width of the pick-up truck bed;
   a first side portion connecting the top base to the bottom base on a passenger side of the pick-up truck;
   a second side portion being non-parallel to the first side portion and connecting the top base to the bottom base on a driver side of the pick-up truck,
   a first support leg connecting to the bottom base on the passenger side of the pick-up truck and being constructed and arranged to interface with the second docking assembly on the passenger side of the pick-up truck; and
   a second support leg connecting to the bottom base on the driver side of the pick-up truck and being constructed and arranged to interface with the second docking assembly on the driver side of the pick-up truck.

5. The mounting rack of claim 4:
   wherein the top base has a set of horns; and
   wherein the top base being constructed and arranged to hold the first end of the ladder includes being constructed and arranged to hook onto the first end of the ladder with at least one of the set of horns.

6. The mounting rack of claim 4:
   wherein the first side portion and the second side portion each has a downward-pointing hook; and
   wherein each hook is constructed and arranged to provide a tying point to secure the first end of the ladder to the first mounting structure.

7. The mounting rack of claim 1, wherein the second mounting structure is substantially trapezoidal and has:
   a top base constructed and arranged to hold the second end of the ladder;

a first side portion connected to the top base on a passenger side of the pick-up truck;

a second side portion being non-parallel to the first side portion and connected to the top base on a driver side of the pick-up truck;

a first support leg being substantially perpendicular to the top base and connecting to the first side portion on the passenger side of the pick-up truck, the first support leg being constructed and arranged to interface with (i) the second docking assembly on the passenger side of the pick-up truck when the second mounting structure is in the storage position, and (ii) the first docking assembly on the passenger side of the pick-up truck when the second mounting structure is in the operating position; and a second support leg being substantially perpendicular to the top base and connecting to the second side portion on the driver side of the pick-up truck, the second support leg being constructed and arranged to interface with (i) the second docking assembly on the driver side of the pick-up truck when the second mounting structure is in the storage position, and (ii) the first docking assembly on the driver side of the pick-up truck when the second mounting structure is in the operating position.

8. The mounting rack of claim 7:
wherein the top base has a set of horns; and
wherein the top base being constructed and arranged to hold the second end of the ladder includes being constructed and arranged to hook onto the second end of the ladder with at least one of the set of horns.

9. The mounting rack of claim 4:
wherein the first side portion and the second side portion each has a downward-pointing hook; and
wherein each hook is constructed and arranged to provide a tying point to secure the second end of the ladder to the second mounting structure.

10. The mounting rack of claim 1, wherein the first mounting structure and the second mounting structure are formed of square tubing.

11. The mounting rack of claim 1:
wherein the rear channel tube of the first rear channel and the second rear channel each comprises a first piece of square tubing substantially as long as a depth of the pick-up truck bed.

12. The mounting rack of claim 1:
wherein the first channel tube of each of the first set of channels and the second set of channels comprises a first piece of square tubing substantially as long as a depth of the pick-up truck bed.

* * * * *